US012126080B2

(12) United States Patent
Lee et al.

(10) Patent No.: US 12,126,080 B2
(45) Date of Patent: Oct. 22, 2024

(54) ANTENNA MODULE

(71) Applicant: HL Klemove Corp., Incheon (KR)

(72) Inventors: Hyunseok Lee, Yongin (KR); Sung Joon Heo, Seongnam (KR)

(73) Assignee: HL KLEMOVE CORP., Incheon (KR)

( * ) Notice: Subject to any disclaimer, the term of this patent is extended or adjusted under 35 U.S.C. 154(b) by 116 days.

(21) Appl. No.: 18/045,828

(22) Filed: Oct. 11, 2022

(65) Prior Publication Data

US 2023/0261386 A1 Aug. 17, 2023

(30) Foreign Application Priority Data

Feb. 11, 2022 (KR) ........................ 10-2022-0017887

(51) Int. Cl.
*H01Q 13/18* (2006.01)
*H01Q 17/00* (2006.01)
*H01Q 21/08* (2006.01)

(52) U.S. Cl.
CPC ............ *H01Q 13/18* (2013.01); *H01Q 17/00* (2013.01); *H01Q 21/08* (2013.01)

(58) Field of Classification Search
CPC ...... H01Q 13/18; H01Q 21/08; H01Q 21/005; H01Q 1/521; H01Q 1/3233; H01Q 1/36; H01Q 1/38; H01Q 17/007
See application file for complete search history.

(56) References Cited

U.S. PATENT DOCUMENTS 8,149,177 B1 * 4/2012 Callus .................. H01Q 21/005 343/705
2017/0187124 A1 * 6/2017 Kirino .................. H01Q 1/3266
2017/0194716 A1 * 7/2017 Kirino ...................... H01P 3/081
2018/0277962 A1 * 9/2018 Kamo ...................... H01P 1/211
2018/0301819 A1 * 10/2018 Kirino ........................ G01S 1/00
2023/0194703 A1 * 6/2023 Doyle .................. H01Q 21/005 342/70

* cited by examiner

*Primary Examiner* — Awat M Salih
(74) *Attorney, Agent, or Firm* — Harvest IP Law, LLP

(57) ABSTRACT

An antenna module is provided. According to an aspect of the present disclosure, an antenna module attached to a support surface provided in a vehicle radar sensor to transmit and receive radio waves may include an antenna body in which one surface is stacked on the support surface; a through path formed inside the antenna body and extending in one direction; at least one slot formed through the through path toward the other surface of the antenna body and extending in the one direction; and a first radio wave absorbing member extending in the one direction and disposed parallel to opposite sides of the through path.

16 Claims, 5 Drawing Sheets

【FIG. 1】
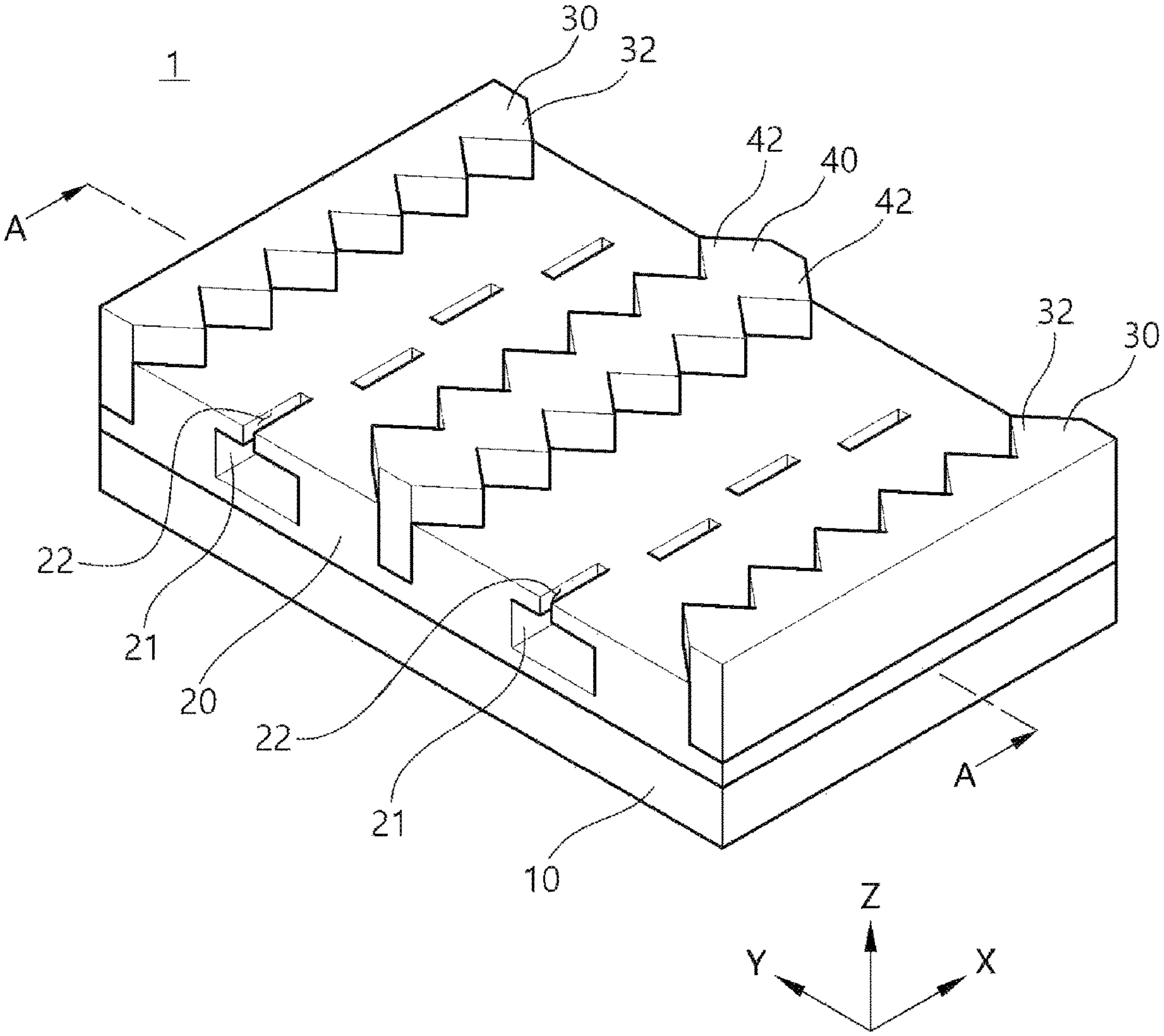

【FIG. 2】
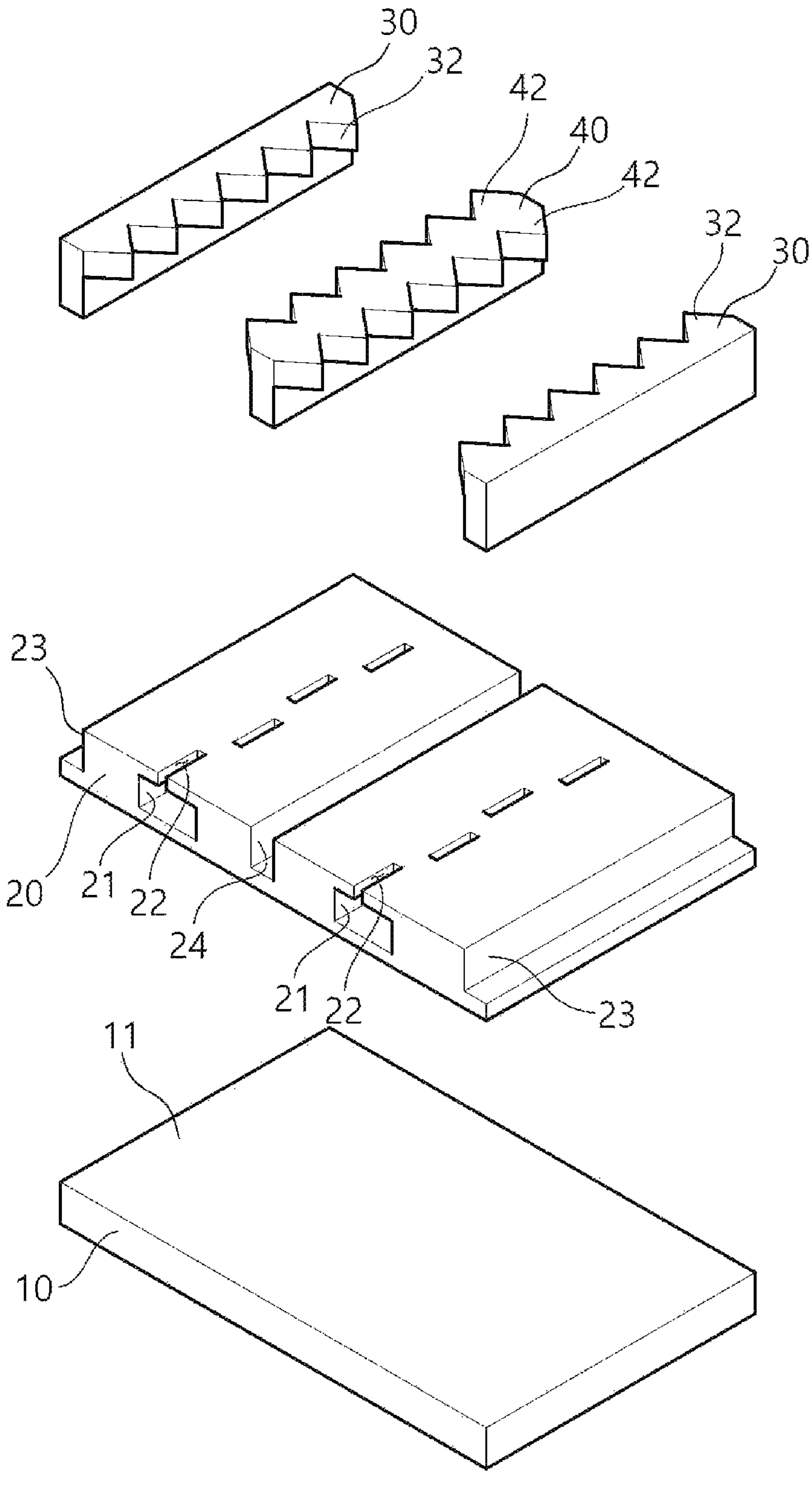

【FIG. 3】
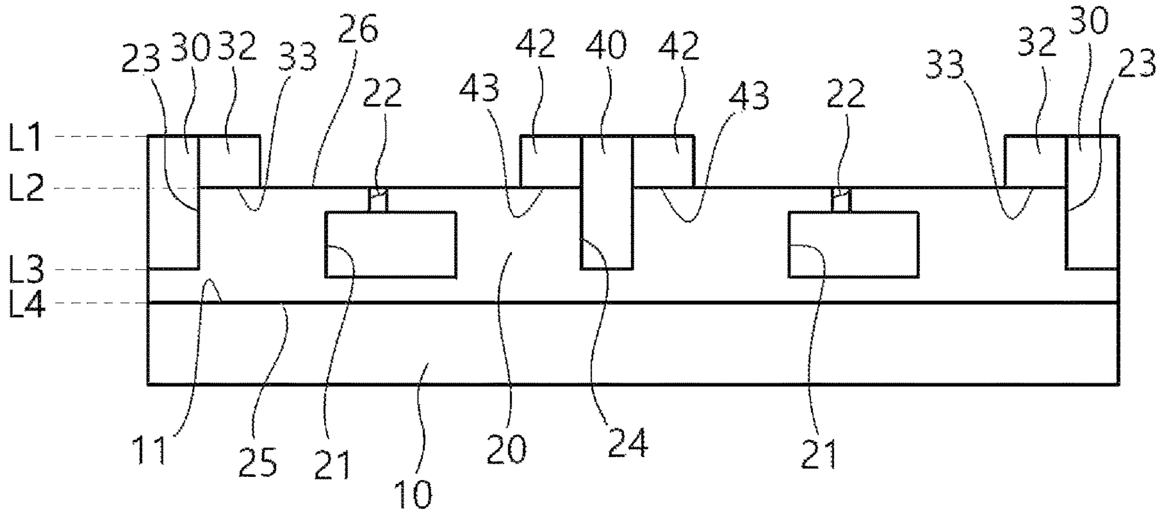

【FIG. 4】
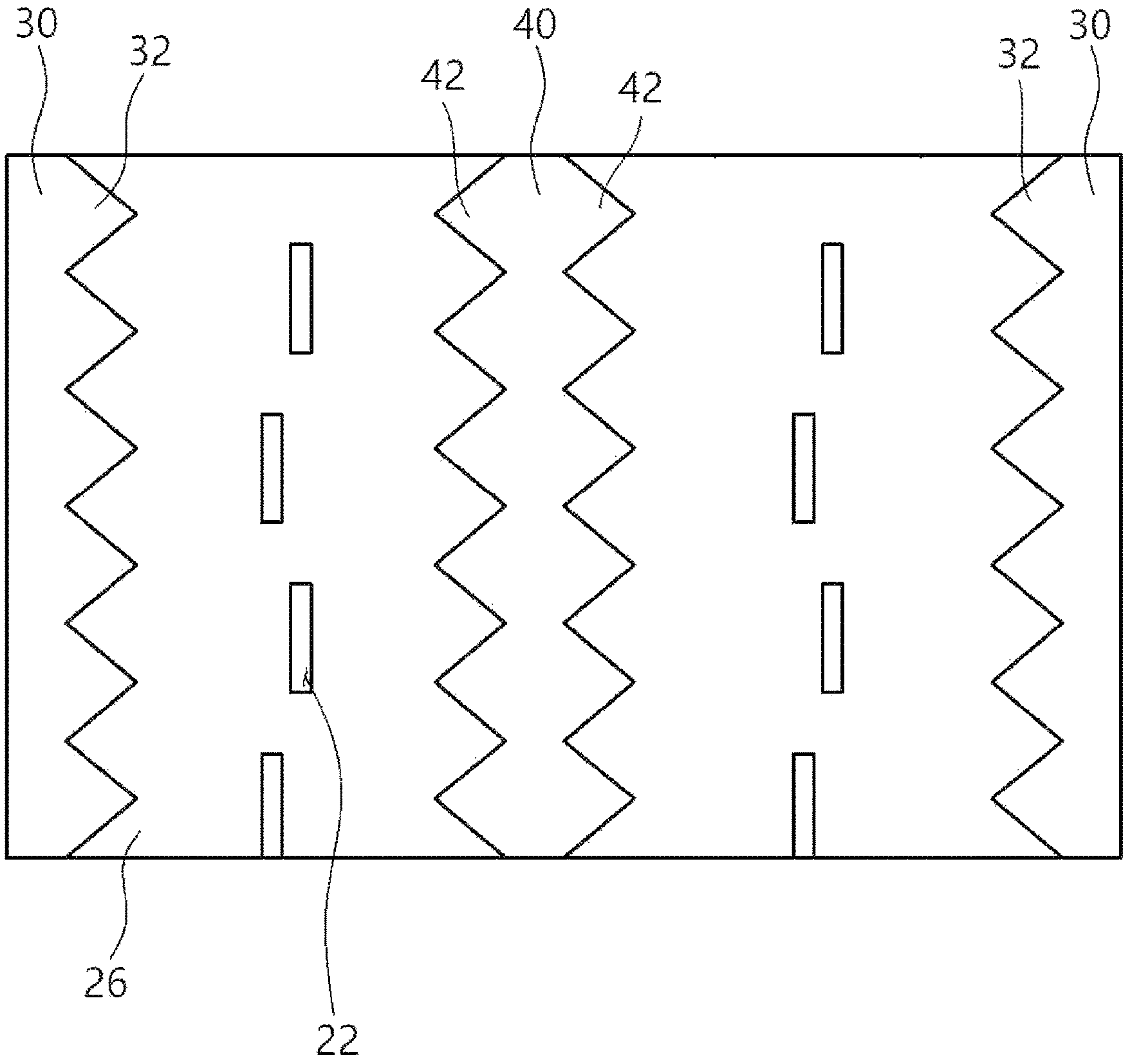

【FIG. 5】
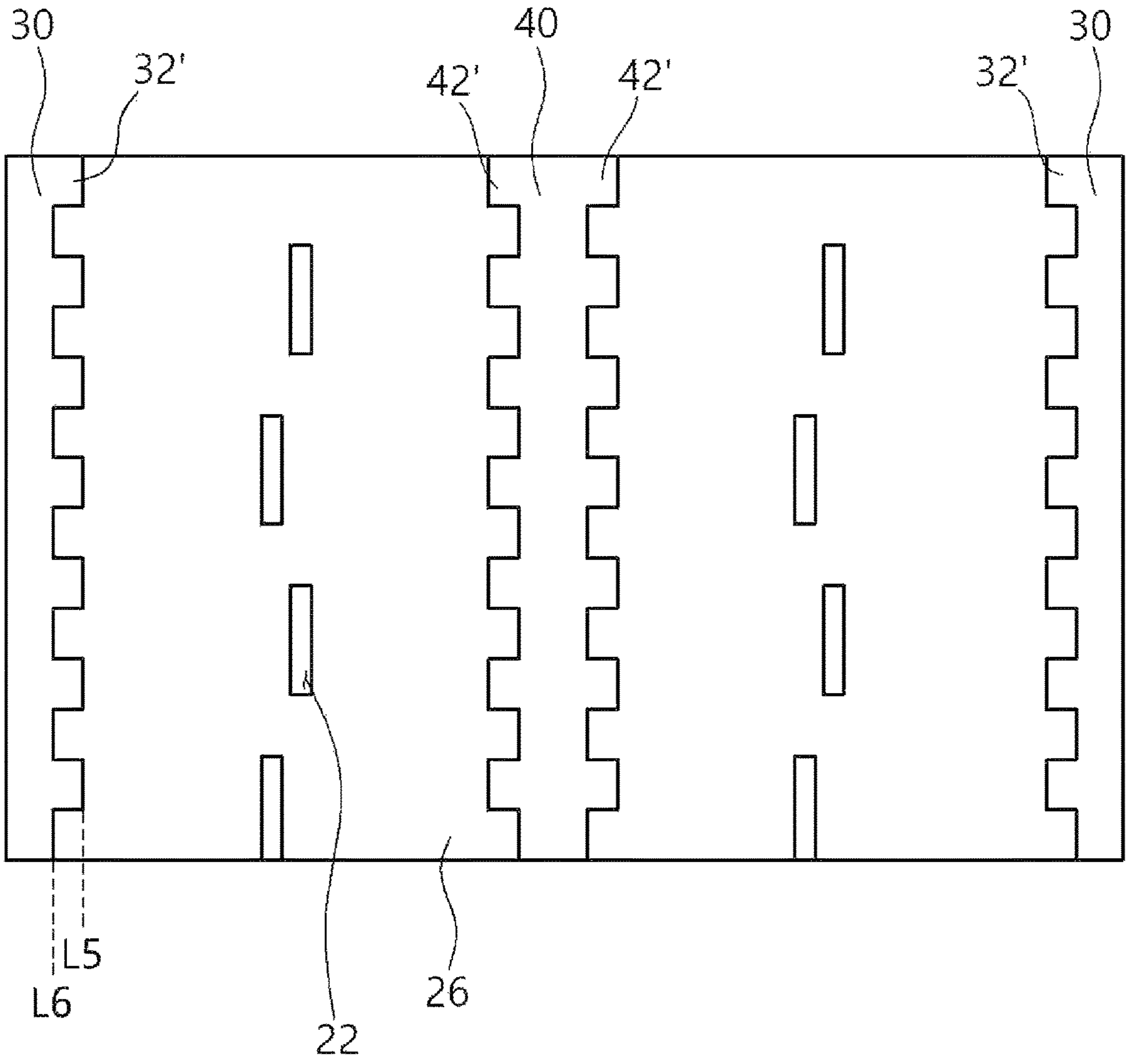

ANTENNA MODULE

CROSS-REFERENCE TO RELATED APPLICATION

This application claims priority to and the benefit of Korean Patent Application No. 10-2022-0017887, filed on Feb. 11, 2022, the disclosure of which is incorporated herein by reference in its entirety.

TECHNICAL FIELD

The present disclosure relates to an antenna module, and more particularly, to an antenna module capable of transmitting and receiving radio waves.

BACKGROUND

Recently, research on a detection system for detecting the surroundings of a vehicle has been accelerated for safety and convenience of a driver. Such a vehicle detection system is used for various purposes, such as detecting objects around a vehicle to prevent collision with objects which are not recognized by a driver and detecting an empty space to perform autonomous parking, and provides the most essential data in vehicle automatic control.

A vehicle monitoring system that has been developed in recent years tends to use a detection device using a radar having excellent detection performance compared to detection sensors such as an infrared sensor and an ultrasonic sensor.

Radar emits a beam and detects the surroundings using reflected signals, and it is possible to accurately detect surrounding objects by scanning at a fine angle. To this end, the radar includes various types of antennas.

In this case, the performance of the antenna, which greatly affects the detection performance of the radar, is determined according to the degree of distortion of the transmitted and received radio waves.

Recently, utilization of an antenna in which a waveguide advantageous for high output and low loss is embedded is increasing, in the case of an antenna having a waveguide embedded therein, there is a problem in that a surface current generated when a radio wave reaches a surface of an antenna body increases fluctuation of a beam pattern of the radio wave, thereby deteriorating phase stability.

Accordingly, there is a need for an antenna module capable of preventing a surface current from being generated while taking advantage of the advantages of high output and low loss.

SUMMARY

Technical Problem

The present disclosure is directed to providing an antenna module capable of preventing distortion of radio waves due to a surface current by suppressing generation of a surface current on a surface of an antenna.

In addition, the present disclosure is directed to provide an antenna module capable of not only increasing an absorption rate of radio waves reaching an antenna surface but also preventing a surface current from being generated on the antenna surface by attenuating the radio waves using reflected radio waves.

The problems of the present disclosure are not limited to those mentioned above, and other problems not mentioned will be clearly understood by those of ordinary skill in the art from the following description.

Technical Solution

In order to solve such problems, according to an aspect of the present disclosure, an antenna module attached to a support surface provided in a vehicle radar sensor to transmit and receive radio waves may include an antenna body in which one surface is stacked on the support surface; a through path formed inside the antenna body and extending in one direction; at least one slot formed through the through path toward the other surface of the antenna body and extending in the one direction; and a first radio wave absorbing member extending in the one direction and disposed parallel to opposite sides of the through path.

In this case, a pair of first grooves formed on opposite sides of the through path and extending in the one direction may be formed on the other surface of the antenna body, and the first radio wave absorbing member may be inserted into the first groove.

In this case, the first radio wave absorbing member may be formed by injection into the first groove.

In this case, the first radio wave absorbing member may be formed to protrude outward from the other surface of the antenna body.

In this case, the first radio wave absorbing member may include a first protrusion protruding toward the through path, and one surface of the first protrusion may be in contact with the other surface of the antenna body.

In this case, the first protrusion may be formed in plurality and the plurality of first protrusions may be continuously disposed along the side surface of the first radio wave absorbing member.

In this case, the first protrusion may be formed in a triangular column shape in which a bottom surface thereof is in contact with the other surface of the antenna body.

In this case, the first protrusion may be formed in a quadrangular column shape in which a bottom surface thereof is in contact with the other surface of the antenna body.

In this case, the through path may be formed in plurality and the plurality of through paths may be formed in parallel with each other at a predetermined distance inside the antenna body, and the antenna module may further include at least one second radio wave absorbing member extending in the one direction between the plurality of through paths and disposed in parallel with the through paths.

In this case, at least one second groove formed between the plurality of through paths and extending in the one direction may be formed on the other surface of the antenna body and the second radio wave absorbing member may be inserted into the second groove.

In this case, the second radio wave absorbing member may be formed by injection into the second groove.

In this case, the second radio wave absorbing member may be formed to protrude outward from the other surface of the antenna body.

In this case, the second radio wave absorbing member may include a second protrusion protruding toward the through path, and one surface of the second protrusion may be in contact with the other surface of the antenna body.

In this case, the second protrusion may be formed in plurality and the plurality of second protrusions may be continuously disposed along opposite side surfaces of the second radio wave absorbing member.

In this case, the second protrusion may be formed in a triangular column shape in which a bottom surface thereof is in contact with the other surface of the antenna body.

In this case, the second protrusion may be formed in a quadrangular column shape in which a bottom surface thereof is in contact with the other surface of the antenna body.

Advantageous Effects

The antenna module according to an exemplary embodiment of the present disclosure includes a first radio wave absorbing member and a second radio wave absorbing member in an antenna body to suppress generation of a surface current on a surface of the antenna, thereby preventing distortion of radio waves due to the surface current.

In addition, the antenna module according to an exemplary embodiment of the present disclosure may include a first protrusion and a second protrusion, thereby not only increasing the absorption rate of the radio waves reaching the surface of the antenna but also attenuating the radio waves using the reflected radio waves, thereby preventing the generation of the surface current on the surface of the antenna.

Advantageous effects of the present disclosure are not limited to the above-described effects, and should be understood to include all effects that can be inferred from the configuration of the disclosure described in the description or claims of the present disclosure.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which:

FIG. 1 is a perspective view of an antenna module according to an exemplary embodiment of the present disclosure.

FIG. 2 is an exploded perspective view of an antenna module according to an exemplary embodiment of the present disclosure.

FIG. 3 a cross-sectional view illustrating a cross-section taken along line A-A of FIG. 1.

FIG. 4 is a top view of an antenna module according to an exemplary embodiment of the present disclosure.

FIG. 5 is a top view of an antenna module according to a modified example of an exemplary embodiment of the present disclosure.

DETAILED DESCRIPTION OF THE EMBODIMENTS

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity of description of the present disclosure, and throughout the specification, like reference numerals denote like elements.

Terms and words used in the present specification and claims should not be construed as limited to their usual or dictionary definition, and they should be interpreted as a meaning and concept consistent with the technical idea of the present disclosure based on the principle that inventors may appropriately define the terms and concept in order to describe their own disclosure in the best way.

Accordingly, the embodiments described in the present specification and the configurations shown in the drawings correspond to preferred embodiments of the present disclosure, and do not represent all the technical spirit of the present disclosure, so the configurations may have various examples of equivalent and modification that can replace them at the time of filing the present disclosure.

It is understood that the terms "comprise" or "have" when used in this specification, are intended to describe the presence of stated features, integers, steps, operations, elements, components and/or a combination thereof but not preclude the possibility of the presence or addition of one or more other features, integers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Hereinafter, an antenna module according to an exemplary embodiment of the present disclosure will be described with reference to the accompanying drawings. FIG. 1 is a perspective view of an antenna module according to an exemplary embodiment of the present disclosure. FIG. 2 is an exploded perspective view of an antenna module according to an exemplary embodiment of the present disclosure. FIG. 3 a cross-sectional view illustrating a cross-section taken along line A-A of FIG. 1. FIG. 4 is a top view of an antenna module according to an exemplary embodiment of the present disclosure. FIG. 5 is a top view of an antenna module according to a modified example of an exemplary embodiment of the present disclosure. In this case, in FIG. 1, the X-axis direction is defined as a front direction, the Y-axis direction is defined as a lateral direction, and the Z-axis direction is defined as an upward direction. However, these directions are relative and not absolute.

As shown in FIG. 1, the present disclosure relates to an antenna module attached to a support surface 11 provided in a vehicle radar sensor 10 to transmit and receive radio waves. In this case, the vehicle radar sensor 10 is not limited to the vehicle radar sensor as long as it has the support surface 11 to which the antenna module 1 according to an exemplary embodiment of the present disclosure can be attached. For example, it may be a substrate embedded in an electronic device requiring radio wave transmission/reception, another antenna module, a housing of an electronic device, or the like.

As shown in FIG. 2, the support surface 11 to which the antenna module 1 is attached may be a flat surface. However, this is not limited thereto. For example, even if there is a curved surface, the antenna body 20 to be described later may be formed by injection molding.

The antenna module 1 according to an exemplary embodiment of the present disclosure includes an antenna body 20, a through path 21, a slot 22, a first radio wave absorbing member 30, and a second radio wave absorbing member 40.

The antenna body 20 is formed in a plate shape in which one surface 25 of the antenna body is stacked on the support surface 11. In this case, one surface 25 of the antenna body may be formed in a shape corresponding to the support surface 11 of the vehicle radar sensor 10, and the other surface 26 of the antenna body, which is a surface opposite to the one surface 25 of the antenna body, may be formed in a flat surface.

One surface 25 of the antenna body may be formed to have a size different from that of the support surface 11. That is, one surface 25 of the antenna body may be formed to be smaller or larger than the support surface 11.

The antenna body 20 may be injected and attached separately from the vehicle radar sensor 10, or may be directly injected and formed on the support surface 11 of the vehicle radar sensor 10.

The antenna body 20 is formed of a conductive material so that the antenna module 1 can transmit and receive radio waves. In this case, when the antenna body 20 is formed by injection molding, it may be formed by injection molding with a non-conductive material and then plating the surface with a conductive material.

The through path 21 is formed inside the antenna body 20. The through path 21 is formed to extend in one direction, as shown in FIGS. 1 and 2. As shown in FIGS. 1 and 3, the through path 21 may have a quadrangle cross-section.

However, the shape of the cross-section of the through path 21 may be designed differently depending on the type of radio waves transmitted and received by the antenna module 1. That is, when the cross-section of the through path 21 is a quadrangle, the width and height of the through path may be designed to have different wavelengths or frequencies of radio waves transmittable and receivable by the antenna module 1.

The through path 21 is a waveguide and serves to guide waves by restricting expansion of electromagnetic waves or sound waves. That is, in principle, electromagnetic waves or sound waves traveling in all directions are propagated along the inside of the through path 21, so that energy is not lost while the electromagnetic waves or sound waves are traveling.

As shown in FIG. 1 and FIG. 4, the slot 22 is formed on the other surface of the antenna body 20. In this case, the slot 22 is formed so that the through path 21 and the outside of the other surface side of the antenna body 20 can communicate. That is, the slot 22 is formed at an upper side of the through path 21 along the through path 21.

As shown in FIG. 1, a plurality of slots 22 may be formed, and the plurality of slots 22 may be arranged in a zigzag manner.

The slot 22 may be formed to extend along the extending direction of the through path 21. In this case, the extended length may vary depending on the type of radio waves transmitted and received by the antenna module 1.

The slot 22 serves to transmit the radio waves by allowing the radio waves travelling along the through path 21 to travel to the outside through the slot 22, or serves to receive the radio waves by allowing the radio waves received from the outside to travel to the inside of the through path 21 through the slot 22 and travel along the through path 21.

In this case, a surface current is generated on the other surface of the antenna body 20 by radio waves transmitted and received through the slot 22. In this case, the surface current distorts the radio waves transmitted and received through the slot 22 to increase the fluctuation of the beam pattern of the radio waves. That is, there may be a problem in that the beam distortion of the radio wave is increased and the phase stability is deteriorated, thereby deteriorating the function of the antenna.

In order to solve the above problem, a pair of first radio wave absorbing members 30 are disposed at opposite sides of the through path 21 as the other surface 26 of the antenna body in which the surface current is generated. The first radio wave absorbing member 30 prevents radio waves from traveling toward the other surface 26 of the antenna body, thereby preventing surface current caused by radio waves from occurring in the antenna body 20.

In this case, the first radio wave absorbing member 30 may be formed of a radio wave absorbing material to absorb radio waves. Various known materials may be used as the radio wave absorbing material, without being limited thereto. As the first radio wave absorbing member 30 is formed of a radio wave absorbing material, when a radio wave comes into contact with the first radio wave absorbing member 30, the radio wave is transmitted into the first radio wave absorbing member 30 and then continuously reflected within the first radio wave absorbing member 30 and cannot go out. Accordingly, the radio waves absorbed by the first radio wave absorbing member 30 cannot reach the other surface 26 of the antenna body and generate no surface current.

As shown in FIG. 1, the first radio wave absorbing member 30 extends along one direction which is an extending direction of the through path 21. In this case, the first radio wave absorbing member 30 is spaced apart from the through path 21 at opposite sides of the through path 21 and arranged in parallel.

As shown in FIG. 3, a pair of first grooves 23 recessed from the other surface of the antenna body 20 may be formed at opposite sides of the through path 21 in the antenna body 20. The first radio wave absorbing member 30 may be inserted into and disposed in the first groove 23.

In this case, as shown in FIG. 3, a depth of the pair of first grooves 23 is a distance between a line L3 extending the innermost surface of the first groove 23 and a line L2 extending the other surface 26 of the antenna body, and is formed to be shorter than a distance between a line L4 extending one surface 25 of the antenna body and a line L2 extending the other surface 26 of the antenna body.

This may not only increase the radio wave absorption rate, but also firmly couple the first radio wave absorbing member 30 to the antenna body 20, as compared to simply disposing the first radio wave absorbing member 30 on the other surface 26 of the antenna body.

In this case, the first radio wave absorbing member 30 may be formed by being injected into the first groove 23. That is, as described above, when the antenna body 20 is formed by injection, the first radio wave absorbing member 30 may be formed by double injection.

As shown in FIG. 3, the first radio wave absorbing member 30 may be formed to protrude upward. That is, a length (distance from L1 to L2) protruding upward of the first radio wave absorbing member 30 may be greater than zero. Through this, the radio wave absorption rate may be increased.

In particular, when the upper side of the first radio wave absorbing member 30 is formed to protrude, the first radio wave absorbing member 30 of the antenna module 1 according to an exemplary embodiment of the present disclosure may include a first protrusion 32.

The first protrusion 32 is formed to protrude from the side surface of the first radio wave absorbing member 30 toward the through path 21. The first protrusion 32 may be formed of the same material as the first radio wave absorbing member 30 and may be integrally formed.

A plurality of first protrusions 32 may be formed, and the plurality of first protrusions 32 are formed to continuously protrude along the side surface of the first radio wave absorbing member 30.

In this case, as shown in FIG. 3, as a lower surface of the first protrusion 32, one surface 33 of the first protrusion is formed to be in contact with the other surface 26 of the antenna body. Accordingly, the area where the radio waves contact the other surface 26 of the antenna body may be further reduced.

As shown in FIG. 4, the first protrusion 32 may be formed in a triangular column shape having a triangular bottom surface. In this case, the bottom surface of the triangular column becomes one surface 33 of the first protrusion, and one of the three side surfaces of the triangular column is connected to the first radio wave absorbing member 30 and the edge formed by the other two side surfaces is formed to face the through path 21.

The triangle, which is the bottom surface of the first protrusion 32, may be an isosceles triangle, which is symmetrical in the lateral direction, or may be a regular triangle. However, this is not limited thereto.

The first protrusion 32 serves to absorb the radio waves to reduce the surface current, and reduces the generation of surface current by attenuating the radio waves that contact the other surface 26 of the antenna body by canceling the radio waves using the radio waves that are not absorbed by the shape of the first protrusion 32 and are reflected.

The first protrusion 32 may be formed in various shapes to attenuate radio waves. For example, as shown in FIG. 5, the first radio wave absorbing member 30 of the antenna module 1 according to a modified example of an exemplary embodiment of the present disclosure may include a first protrusion 32' having a quadrangular column shape. In this case, the bottom surface of the quadrangular column becomes one surface 33 of the first protrusion.

The first protrusion 32' protrudes from the side surface of the first radio wave absorbing member 30 protruding upward toward the through path 21, and the protruding length (distance from L5 to L6) may be designed differently depending on the type of radio wave.

Although not shown in the drawings, the shape of the first protrusion 32 may be formed in various structures capable of increasing attenuation efficiency according to radio waves, for example, in the form of a polygonal column or a semi-circular column not described above.

Meanwhile, as shown in FIG. 1, a plurality of through paths 21 may be formed inside the antenna body 20. The plurality of through paths 21 are spaced apart from each other at predetermined intervals and arranged in parallel. Each of the through paths 21 serves to induce the propagation of radio waves.

In this case, since the first radio wave absorbing member 30 is disposed on the outermost portion of the plurality of through paths 21, a surface current may be generated on the other surface 26 of the antenna body positioned between the plurality of through paths 21. In order to prevent this, the second radio wave absorbing member 40 is disposed between the plurality of through paths 21. That is, the number of the second radio wave absorbing members 40 formed is one less than the number of the through paths 21.

The second radio wave absorbing member 40 may be formed of the same material as the first radio wave absorbing member 30, and may be formed according to the same manufacturing method. For example, it may be formed by double injection simultaneously with the first radio wave absorbing member 30.

A second groove 24 is formed in the antenna body 20, like the first groove 23. The second groove 24 is formed between the plurality of through paths 21, as shown in FIGS. 2 and 3. In this case, the description of the shape of the second groove 24 is replaced with the description of the first groove 23.

The second radio wave absorbing member 40 is inserted into and disposed in the second groove 24. As described above, the second radio wave absorbing member 40 may be formed by being double injected into the second groove 24. Accordingly, the number of the second grooves 24 formed is the same as the number of the second radio wave absorbing members 40.

The second radio wave absorbing member 40 may be formed to protrude upward from the other surface 26 of the antenna body, like the first radio wave absorbing member 30, and the second protrusion 42 corresponding to the first protrusion 32 may be formed on the protruding side surface of the second radio wave absorbing member 40.

A plurality of second protrusions 42 may be formed, and may protrude from both side surfaces of the second radio wave absorbing member 40 toward the respective through paths 21, and as shown in FIG. 4, the plurality of second protrusions 42 may be continuously formed along opposite side surfaces of the second radio wave absorbing member 40. As shown in FIG. 3, one surface 43 of the second protrusion, which is a lower surface of the second protrusion 42, is also formed to be in contact with the other surface of the antenna body, like the first protrusion 32. Other description of the shape of the second protrusion 42 is replaced with the description of the shape of the first protrusion 32.

As described above, preferred embodiments according to the present disclosure have been examined, and it is obvious to those skilled in the art that the present disclosure can be embodied in other specific forms without departing from the spirit or scope of the present disclosure in addition to the above-described embodiments. Therefore, the above-described embodiments are to be construed as illustrative rather than restrictive, and accordingly, the present disclosure is not limited to the above description and may be modified within the scope of the appended claims and their equivalents.

DESCRIPTION OF SYMBOLS

| | |
|---|---|
| 1 | antenna module |
| 10 | vehicle radar sensor |
| 11 | support surface |
| 20 | antenna body |
| 21 | through path |
| 22 | slot |
| 23 | first groove |
| 24 | second groove |
| 25 | one surface of antenna body |
| 26 | the other surface of antenna body |
| 30 | first radio wave absorbing member |
| 32, 32' | first protrusion |
| 33 | one surface of first protrusion |
| 40 | second radio wave absorbing member |
| 42 | second protrusion |
| 43 | one surface of second protrusion |

What is claimed is:

1. An antenna module attached to a support surface provided in a vehicle radar sensor to transmit and receive radio waves, the antenna module comprising:

an antenna body in which one surface is stacked on the support surface;

a through path formed inside the antenna body and extending in one direction;

at least one slot formed through the through path toward the other surface of the antenna body and extending in the one direction; and a first radio wave absorbing member extending in the one direction and disposed parallel to opposite sides of the through path.

2. The antenna module of claim 1, wherein a pair of first grooves formed on opposite sides of the through path and extending in the one direction are formed on the other surface of the antenna body, and the first radio wave absorbing member is inserted into the first groove.

3. The antenna module of claim 2, wherein the first radio wave absorbing member is formed by injection into the first groove.

4. The antenna module of claim 1, wherein the first radio wave absorbing member is formed to protrude outward from the other surface of the antenna body.

5. The antenna module of claim 4, wherein the first radio wave absorbing member comprises a first protrusion protruding toward the through path, and one surface of the first protrusion is in contact with the other surface of the antenna body.

6. The antenna module of claim 5, wherein the first protrusion is formed in plurality, and the plurality of first protrusions are continuously disposed along the side surface of the first radio wave absorbing member.

7. The antenna module of claim 5, wherein the first protrusion is formed in a triangular column shape in which a bottom surface thereof is in contact with the other surface of the antenna body.

8. The antenna module of claim 5, wherein the first protrusion is formed in a quadrangular column shape in which a bottom surface thereof is in contact with the other surface of the antenna body.

9. The antenna module of claim 1, wherein the through path is formed in plurality and the plurality of through paths are formed in parallel with each other at a predetermined distance inside the antenna body, and the antenna module further comprises at least one second radio wave absorbing member extending in the one direction between the plurality of through paths and disposed in parallel with the through paths.

10. The antenna module of claim 9, wherein at least one second groove formed between the plurality of through paths and extending in the one direction is formed on the other surface of the antenna body, and the second radio wave absorbing member is inserted into the second groove.

11. The antenna module of claim 10, wherein the second radio wave absorbing member is formed by injection into the second groove.

12. The antenna module of claim 9, wherein the second radio wave absorbing member is formed to protrude outward from the other surface of the antenna body.

13. The antenna module of claim 12, wherein the second radio wave absorbing member comprises a second protrusion protruding toward the through path, and one surface of the second protrusion is in contact with the other surface of the antenna body.

14. The antenna module of claim 13, wherein the second protrusion is formed in plurality, and the plurality of second protrusions are continuously disposed along opposite side surfaces of the second radio wave absorbing member.

15. The antenna module of claim 13, wherein the second protrusion is formed in a triangular column shape in which a bottom surface thereof is in contact with the other surface of the antenna body.

16. The antenna module of claim 13, wherein the second protrusion is formed in a quadrangular column shape in which a bottom surface thereof is in contact with the other surface of the antenna body.

* * * * *